(12) United States Patent
Grenfell

(10) Patent No.: US 9,501,859 B2
(45) Date of Patent: Nov. 22, 2016

(54) TRIANGLE RASTERIZATION

(71) Applicant: Adobe Systems Incorporated, San Jose, CA (US)

(72) Inventor: Desmond Trevor Thomas Grenfell, Lancashire (GB)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 368 days.

(21) Appl. No.: 13/946,014

(22) Filed: Jul. 19, 2013

(65) Prior Publication Data
US 2015/0022525 A1    Jan. 22, 2015

(51) Int. Cl.
G06T 15/00    (2011.01)
G06T 1/20    (2006.01)

(52) U.S. Cl.
CPC .............. *G06T 15/005* (2013.01); *G06T 1/20* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 5,446,836 A | 8/1995 | Lentz et al. | |
| 5,528,737 A * | 6/1996 | Sfarti | 345/441 |
| 6,636,218 B1 | 10/2003 | Nelson | |
| 7,952,580 B1 | 5/2011 | Yhann et al. | |
| 8,730,249 B2 * | 5/2014 | Danskin et al. | 345/505 |
| 2004/0021675 A1 | 2/2004 | Brkic | |
| 2004/0207642 A1 * | 10/2004 | Crisu | G06T 11/203 345/626 |
| 2005/0134603 A1 | 6/2005 | Iourcha et al. | |
| 2008/0246765 A1 | 10/2008 | Grenfell | |

OTHER PUBLICATIONS

Capens, Nicolas, "Advanced Rasterization", retrieved from http://web.archive.org/web/20130425231827/http://devmaster.net/forums/topic/1145-advanced-rasterization (snapshot of webpage on Apr. 25, 2013).*
Abrash, M., "Rasterization on Larrabee", Dr. Dobb's The World of Software Development, May, 1, 2009, URL:http://www.drdobbs.com/parallel/rasterization-on-larrabee/217200602.*
Abrash, Michael; "Rasterization on Larrabee", retrieved from http://www.drdobbs.com/parallel/rasterization-on-larrabee/217200602# on May 28, 2013.
Capens, Nicholas; "Advanced Rasterization", retrieved from http://devmaster.net/forums/topic/1145-advanced-rasterization/ on May 28, 2013.
Jamin, Sugih; EECS 487 Lesson 6 Lecture Notes for Jan. 22, 2013, retrieved from http://web.eecs.unmich.edu/~sugih/courses/eecs487/lectures/06-TriangleRasterization.pdf on May 28, 2013.

* cited by examiner

*Primary Examiner* — Maurice L McDowell, Jr.
*Assistant Examiner* — Donna J Ricks
(74) *Attorney, Agent, or Firm* — Finch & Maloney PLLC

(57) ABSTRACT

Techniques are disclosed for deriving a list of pixels contained within a projected triangle in a way that is computationally efficient. In particular, the recursive techniques disclosed herein are particularly well-suited for implementation on modern multi-processor computer systems, and enable a list of pixels contained within a projected triangle to be derived quickly and efficiently. For example, in certain embodiments a network of projected triangles is overlaid by a plurality of tiles, which are subsequently divided into an array of sub-tiles, each of which can be processed in parallel by a multi-processor computer system. This recursive process advantageously allows three-dimensional objects to be rendered in a computationally efficient manner.

20 Claims, 11 Drawing Sheets

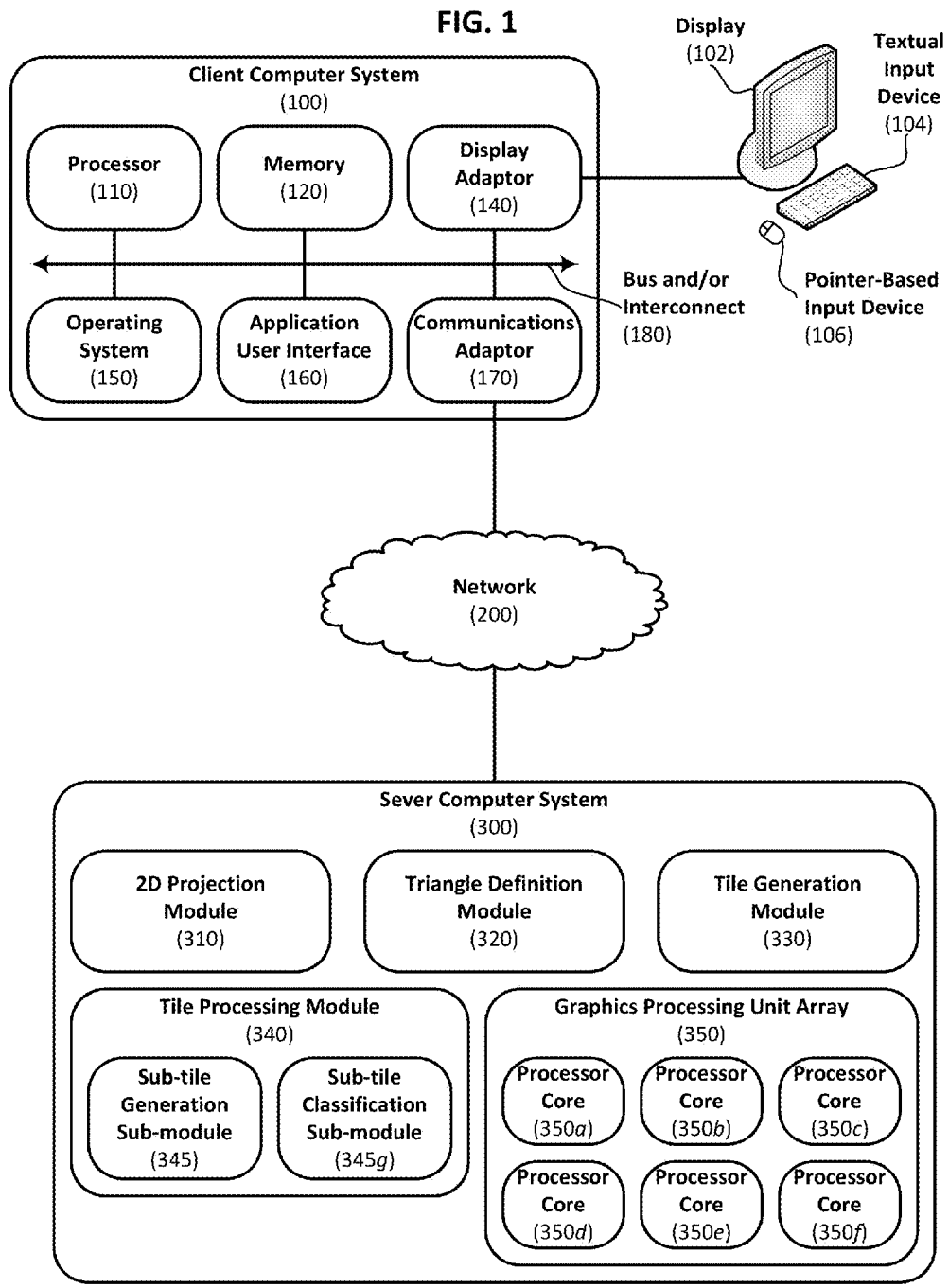

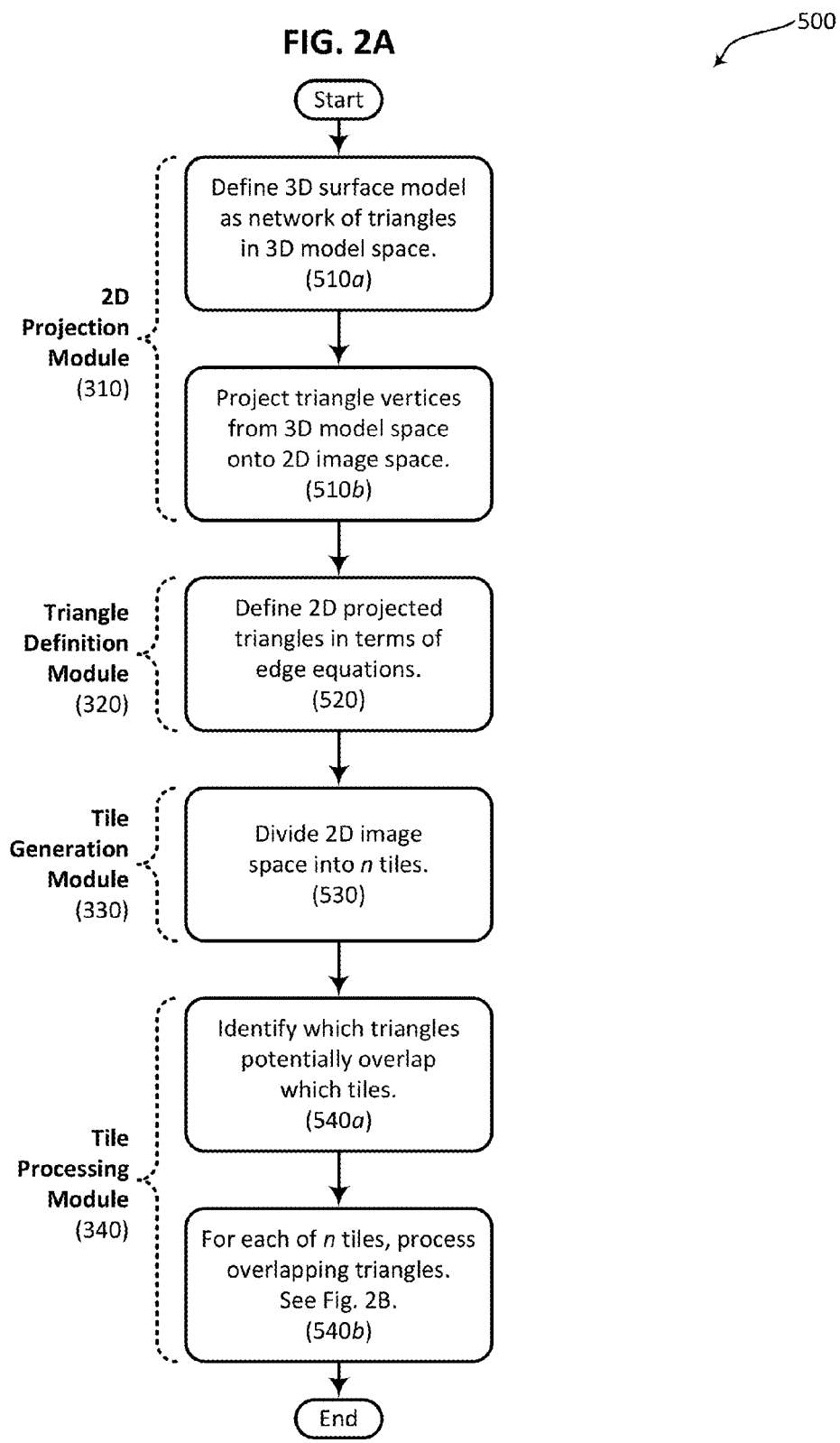

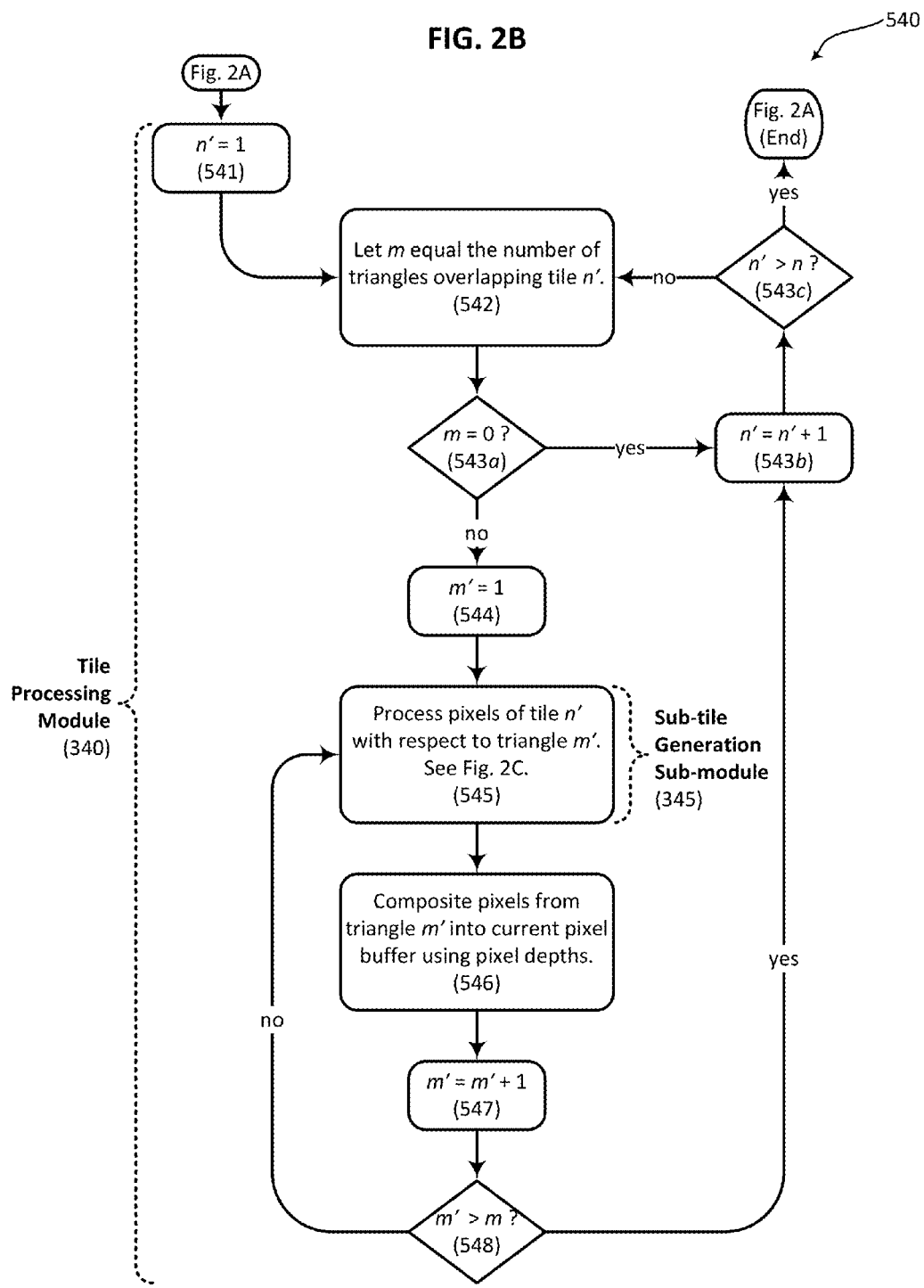

TRIANGLE RASTERIZATION

FIELD OF THE DISCLOSURE

This disclosure relates generally to the field of computer graphics, and more specifically, to computationally efficient techniques for rendering images of three-dimensional objects defined in terms of a network of vertices and triangles.

BACKGROUND

It is often desired to display a three-dimensional object as an image in a two-dimensional space, such as on a display screen or on a printed piece of paper. This can be accomplished by first describing the three-dimensional object as a composition of basic geometric shapes called "primitives" that define the shape of the object. One common primitive that is frequently used in this regard is a triangle. For example, three-dimensional surface models are commonly represented by meshes or networks of triangles. In such applications, each triangle can be defined in terms of its three vertices, each of which can in turn be defined using a suitable coordinate system, such as with Cartesian coordinates x, y, z. Once the primitives are adequately defined, they can be projected to form a two-dimensional image that can be generated using a raster device, such as a computer display or printer, in a process called "rasterization". The raster device displays or otherwise generates the image using an array of picture elements ("pixels"), which are the smallest units that the device can use to represent the primitives.

BRIEF DESCRIPTION OF THE DRAWINGS

FIG. 1 is a block diagram schematically illustrating selected components of a computer system that can be used to derive a list of pixels contained within a projected triangle according to certain embodiments of the present invention.

FIG. 2A is a flowchart illustrating an example triangle rasterization methodology that can be used in certain embodiments of the present invention for deriving a list of pixels contained within a projected triangle.

FIG. 2B is a flowchart illustrating an example tile processing methodology that can be used in certain embodiments of the present invention for processing tiles which are overlapped by a projected triangle for the purpose of deriving a list of pixels contained within the projected triangle.

DETAILED DESCRIPTION

Figure 2C:
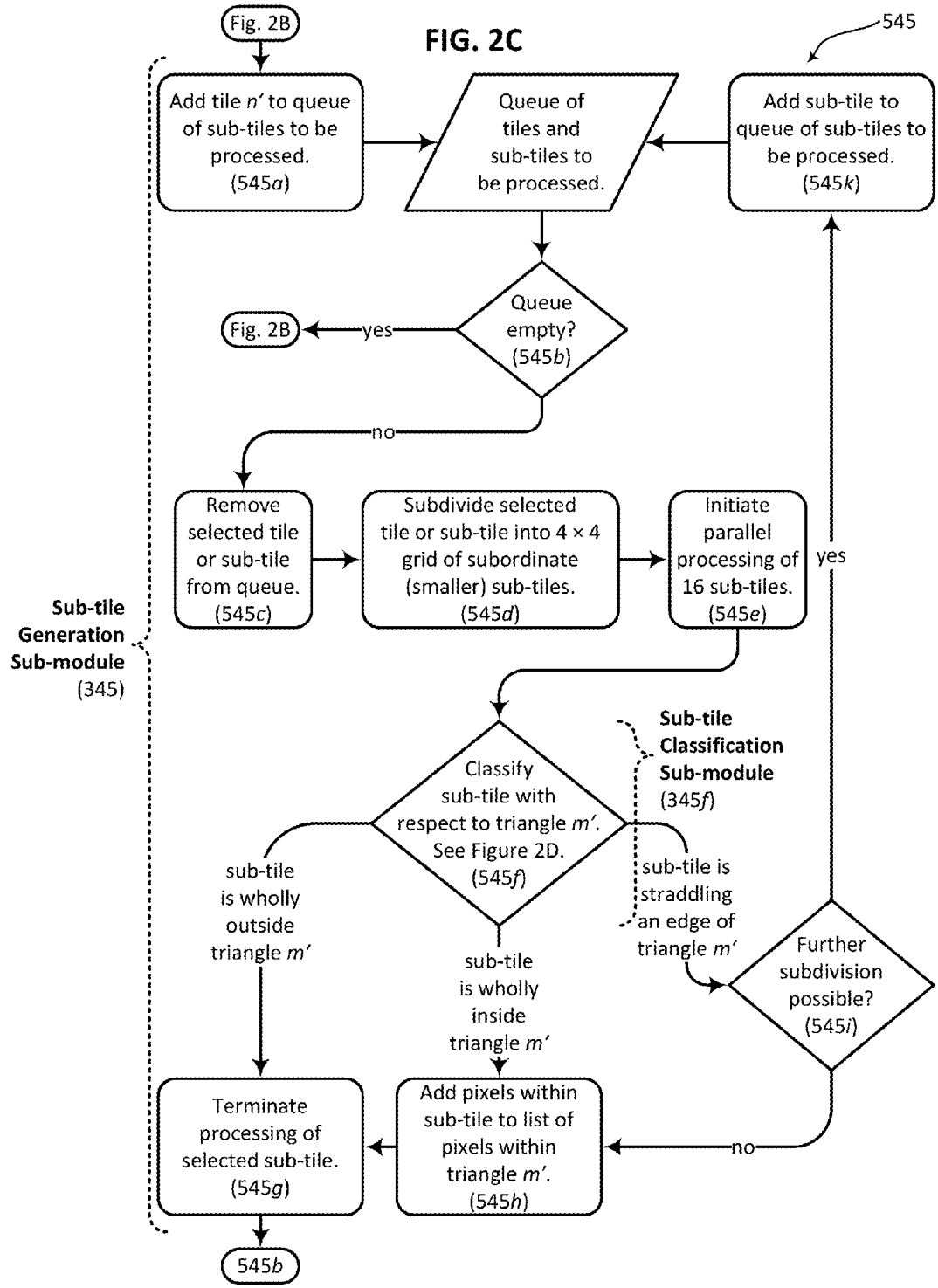
FIG. 2C is a flowchart illustrating an example sub-tile processing methodology that can be used in certain embodiments of the present invention for evaluating pixels of a particular tile n' with respect to a particular projected triangle m', based on a plurality of sub-tiles contained within the particular tile n'.

Techniques are disclosed for rendering images of three-dimensional objects, defined in terms of vertices and triangles, by deriving a list of pixels contained within a projected triangle in a way that is computationally efficient. When an image of a three-dimensional object is to be displayed in a two-dimensional image space, primitives representing the object are projected onto the two-dimensional image space. The primitives define how the three-dimensional object will appear from a specific viewpoint in three-dimensional model space. Once projected onto the two-dimensional image space, these primitives can then be rendered using a raster device, such as a computer display or printer. When a projected triangle is rasterized, a list of pixels falling within the projected two-dimensional triangle can be generated and subsequently used to not only render the triangle using the raster device, but also to further manipulate the triangle and therefore the overall appearance of the displayed object. The process of identifying which pixels fall within a projected triangle can be computationally rigorous, and may often consume significant computer resources. To this end, the recursive techniques disclosed herein are particularly well-suited for implementation on modern multi-processor computer systems, and which enable a list of pixels contained within a projected triangle to be derived quickly and efficiently. For example, in certain embodiments projected triangles are overlaid by a plurality of tiles, which are subsequently divided into an array of sub-tiles, each of which can be processed in parallel by a multi-processor computer system. This recursive process advantageously allows three-dimensional objects to be rendered in a computationally efficient manner. Numerous configurations and variations of such techniques will be apparent in light of this disclosure.

General Overview

Consumers tend to highly regard digital media assets that include state-of-the-art computer-generated imagery. As a result, there has been an increased emphasis on developing ways to satisfy the computational processing requirements for generation of such imagery. The computing resources required to render high resolution visual effects for film, television and other multimedia assets can be significant, and managing costs associated with the provision of such resources is an important aspect of digital media asset generation. To satisfy consumer demand, server farms devoted to rendering computer-generated imagery have been developed. Such farms often comprise hundreds or even thousands of processors capable of simultaneously performing identical tasks, thereby taking advantage of the fact that many rendering operations are highly parallelizable. These server farms, also referred to as "rendering farms", take advantage of certain processing techniques for increasing performance at a given processor clock speed. These techniques include simultaneously executing a single instruction on multiple data (SIMD) and simultaneously executing multiple (different) instructions on multiple data (MIMD). However, notwithstanding these advances, the computational costs associated with rendering computer-generated imagery remain significant, particularly when rendering high-resolution three-dimensional imagery that is to have a realistic appearance.

Thus, and in accordance with certain embodiments of the present invention, techniques are provided herein for rendering three-dimensional imagery in a way that is particularly well-suited for implementation using modern rendering farms. Such techniques can be used, for example, to quickly and efficiently derive a list of pixels contained within a projected triangle in a process referred to as "triangle rasterization". This is significant because triangle rasterization is one of the fundamental operations underlying the rendering of computer-generated imagery. In one embodiment, a triangle rasterization technique comprises projecting a mesh or network of triangles from a three-dimensional model space onto a two-dimensional image space. The triangles may represent, for example, a three-dimensional surface model that is to be rendered in the two-dimensional image space. Each of the projected two-dimensional triangles to be rasterized can be characterized in terms of three normalized edge equations that define the three oriented edges of the triangle. The pixel array into which the network of projected two-dimensional triangles is to be rasterized can then be divided into an array of n non-overlapping equally-sized tiles which overlay the network of triangles. In certain embodiments, each tile is square with a side length of $a^b$ pixels, where a is a small positive whole number and b is a whole number. Negative values of b indicate sub-pixel sized tiles. In one embodiment a=4 and b=3, although other values can be used in other embodiments. The n tiles, each of which can be considered to be overlapping m triangles (m≥0), can then each be divided into a grid of a×a square sub-tiles, where each sub-tile has a side length of $a^{b-1}$ pixels (or sub-pixels where b<1).

In such embodiments the normalized edge equations can be used to characterize a selected sub-tile n' as wholly inside a selected triangle m', wholly outside selected triangle m', or straddling an edge of selected triangle m'. If sub-tile n' is wholly inside triangle m', the pixels corresponding to sub-tile n' can be added to a list of pixels within triangle m'. However, if sub-tile n' is wholly outside triangle m', the pixels corresponding to sub-tile n' can be rejected with respect to triangle m'. If sub-tile n' straddles an edge of triangle m', sub-tile n' can be further subdivided and the processing of the resulting subordinate (smaller) sub-tiles can be repeated as appropriate, or at least until a predetermined limit on the resolution of the sub-tiles is reached. The limit can be either multiple pixels or sub-pixel in size. This process can be applied recursively until there are no straddling sub-tiles, or more likely, until any remaining sub-tiles are at the predetermined resolution limit. The result of such triangle rasterization is a list of tiles and sub-tiles of varying recursive depths which can be quickly converted to a list of individual pixels or sub-pixels. Such a list can be used in subsequent higher-level processing, for example, to perform visibility assessment based on a depth-buffer, to perform shading operations using sophisticated lighting algorithms, and/or for any other such applications. Because the initial three-dimensional surface model may include a large number of triangles, it is useful to have the foregoing triangle rasterization be computationally efficient.

To that end, certain of the triangle rasterization methodologies disclosed herein are particularly well-suited for implementation using modern multi-processor computer systems that use the aforementioned SIMD and MIMD processing techniques. For instance, SIMD processing takes advantage of the wide registers of modern processors which allow multiple independent values to be simultaneously loaded and operated upon. For example, the Advanced Vector Extensions (AVX) processor architecture allows eight single precision floating point numbers to be simultaneously loaded and operated upon against a second set of eight single precision floating point numbers. The methodologies disclosed herein for classifying a triangle with respect to a specific sub-tile are able to exploit the parallelism provided by SIMD processing to provide a high level of efficiency. In particular, because the processing of multiple sub-tiles involves the execution of the same instructions, multiple sub-tiles can therefore be processed simultaneously by sequentially loading data associated with such sub-tiles into the wide registers of a modern processor and then applying a uniform set of instructions to the entire processor. Likewise, MIMD processing, which can be provided by the multiple processor cores included in modern server computing systems, allows multiple code threads to be simultaneously executed. The methodologies disclosed herein for processing an array of n tiles are able to exploit the parallelism provided by MIMD processing because each of the n tiles can be executed as a separate thread. That is, each tile can be seen as representing a distinct computational task which can be assigned to a separate code thread which can, in turn be executed in parallel on a separate processor core, thereby providing scalability for MIMD processing. Thus, by simultaneously leveraging both the SIMD and MIMD processing capabilities of a modern rendering farm, an embodiment of the triangle rasterization methodologies disclosed herein can be used to render three-dimensional imagery with a particularly high level of efficiency. The net effect of such an embodiment is to provide a methodology that can exploit two of the most powerful features of modern processor architecture: wide registers (for SIMD processing) and multiple cores (for MIMD processing).

Another aspect of certain embodiments that improves computational efficiency is the use of the aforementioned normalized edge equations. By defining projected triangles using such equations, tighter bounds on triangle-tile classification can be achieved, thus allowing excluded sub-tiles to be rejected earlier in the rasterization process. In addition, the use of normalized edge equations provides for natural generation of barycentric pixel and sub-pixel coordinates. A barycentric coordinate system is a coordinate system in which the location of a point within a triangle is specified in terms of the normalized areas that the point subtends at each of the triangle vertices. This is particularly useful because the maximum and minimum barycentric coordinates of the "critical" corners of a sub-tile can be used to evaluate the status of that sub-tile with respect to a given triangle edge. That is, the barycentric coordinates of the critical corners of a sub-tile can be used to determine whether that sub-tile is wholly within, wholly outside or straddling a corresponding triangle edge. The selection of the critical corners of a sub-tile can be hard-coded in advance for each possible edge classification as shown in, and as further described below in connection with, FIG. 3. This further contributes to the streamlining of the triangle rasterization process. Barycentric pixel and sub-pixel coordinates can also be used in subsequent states of the image creation pipeline, and thus their generation during the triangle rasterization process contributes to even further conservation of computing resources.

It will be appreciated that the methodologies disclosed herein can be applied to a wide variety of graphical processing applications. For example, certain of the techniques disclosed herein can be used to render complex computer-generated imagery at a rendering farm having hundreds or thousands of processors devoted to graphical image processing. In such case the techniques can be implemented in a client-server computing environment wherein a user of a client computer system having relatively limited processing capacity leverages the resources of one or more server computer systems having a relatively large processing capacity. However in other embodiments the techniques disclosed herein can be implemented entirely on a client computer system, thereby allowing such a system to perform rendering operations which might otherwise be difficult or impossible. It will also be appreciated that the image processing methodologies disclosed herein can be applied to a wide variety of media assets, including the manipulation three-dimensional video assets such as animation, special effects and other video assets. In general, it will be further appreciated that the processing techniques disclosed herein can be applied to a wide variety of media assets stored in a wide variety of formats, and are not intended to be limited to any particular asset type or storage format.

System Architecture

FIG. 1 is a block diagram schematically illustrating selected components of computer systems that can be used to derive a list of pixels contained within a projected triangle according to certain embodiments of the present invention. The methodologies disclosed herein can be performed in a client-server computing environment such as that illustrated in FIG. 1, wherein a client computer system 100 interacts with a server computer system 300 via a network 200. Computer systems 100, 300 may comprise, for example, one or more devices selected from a desktop or laptop computer, a mainframe computer, a cloud-based computing resource, a workstation, a tablet, a smartphone, a set-top box or any other such computing device. A combination of different devices may be used in certain embodiments. For example, in one embodiment client computer system 100 comprises a desktop or tablet computer capable of accessing resources managed by server computer system 300, while server computer system 300 comprises a dedicated rendering farm having an array of graphics processing units capable of SIMD and MIMD processing techniques. Computer systems 100, 300 are coupled to network 200 to allow for communications with each other, as well as with a wide variety of other resources and/or devices not illustrated in FIG. 1, such as cloud-based asset storage resources.

As illustrated in FIG. 1, in one embodiment client computer system 100 includes external peripherals such as a display 102, a textual input device 104 and a pointer-based input device 106. Display 102 is an example of a raster device that can be used to display representations of three-dimensional images using an array of pixels. In certain embodiments multiple displays 102 are coupled to client computer system 100. In other embodiments client computer system 100 may include additional and/or alternative raster devices, such as a printer, that can be used for the same purpose. Textual and pointer-based input devices 104, 106 can be used to control client computer system 100, including control of interactions with server computer system 300. In certain embodiments the functionality associated with input devices 104, 106 is provided by separate components such as a keyboard and mouse, respectively, while in other embodiments such functionality is provided by an integrated device, such as a touch-sensitive display device. It will be appreciated that the external peripherals illustrated in FIG. 1 are provided by way of example only, and that in other embodiments client computer system 100 may be provided with additional, fewer or alternative external peripherals. It will also be appreciated that certain external peripherals can be integrated with client computer system 100 instead of being provided separately, as may be particularly useful in the case of a portable device such as a smartphone or tablet computer.

Client computer system 100 also includes internal components such as one or more of a processor 110, a memory 120, a display adaptor 140, an operating system 150, an application user interface 160, a communications adaptor 170, and a bus and/or interconnect 180. Processor 110 may comprise any suitable processor and may optionally include one or more coprocessors or controllers, such as a graphical processing unit, to assist in processing operations. Memory 120 can be implemented using any suitable type of digital storage, such as one or more of a disk drive, a universal serial bus (USB) drive, flash memory and/or random access memory. Display adaptor 140 can be implemented using any suitable type of hardware capable of generating a feed of output images to a rasterized display device, such as display 102, and may optionally provide processing capacity for accelerating the rendering of three-dimensional imagery. For example, in certain embodiments the methodologies disclosed herein can be at least partially performed using processing capacity provided by display adaptor 140. Operating system 150 may comprise any suitable operating system, such as Google Android, Microsoft Windows or Apple OS X. As will be appreciated in light of this disclosure, the techniques provided herein can be implemented without regard to the particular operating system provided on client computer system 100, and therefore may also be implemented using any suitable existing or subsequently-developed platform.

Application user interface 160 is configured to provide information to, and to receive information and commands from, a user. It can be implemented with or otherwise used in conjunction with a variety of suitable input/output hardware devices that are coupled to or that otherwise form a part of computer system 100. For example, in one embodiment application user interface 160 comprises a software application that provides multimedia rendering services by leveraging processing resources provided by server computer system 300. In certain embodiments application user interface 160 is installed local to client computer system 100, while in other embodiments at least some portions of application user interface 160 are provided using an applet, such as a JavaScript applet, or other downloadable module. Such a remotely accessible module can be provisioned in real-time in response to a request from client computer system 100 for access to a given server having resources that are of interest to a user. For example, a user of a tablet computer may invoke application user interface 160 upon accessing a cloud-based repository of multimedia and/or other content that the user wishes to edit. In such embodiments the server can be local to network 200 or remotely coupled to network 200 by one or more other networks and/or communication channels. In any such stand-alone or networked computing scenarios, application user interface 160 may be implemented with any suitable interface technologies that allow a user to interact with computer systems 100, 300.

Communications module 170 may be any suitable network chip or chipset which allows for wired and/or wireless communication to network 200, such that client computer system 100 can communicate with server computer system 300, as well as with other local and/or remote computing resources or devices. For example, in one embodiment communications module 170 provides access to a networked redundant array of independent disks (RAID) multimedia asset storage resource. Bus and/or interconnect 180 can be provided to allow for inter- and intra-device communications using, for example, communications module 170. Network 200 may be a local area network (such as a home-based or office network), a wide area network (such as the Internet) or a combination of such networks, whether public, private or both. In some cases access to resources on a given network or computing system may require credentials such as usernames, passwords and/or any other suitable security mechanism.

In certain embodiments server computer system 300 comprises a dedicated server farm specifically configured for bulk processing of certain tasks associated with the rendering of computer-generated imagery. As illustrated in FIG. 1, an example embodiment of computer system 300 includes a two-dimensional projection module 310, a triangle definition module 320, a tile generation module 330 and a tile processing module 340. Server computer system 300 also includes a graphics processing unit array 350 comprising a plurality of processor cores 350a through 350f It will be appreciated that while array 350 is illustrated as comprising only six processor cores in FIG. 1, in general array 350 may include any number of processor cores based on the computational demands placed on server computer system 300. In certain embodiments, the plurality of processor cores, taken collectively, are simultaneously capable of both SIMD and MIMD processing techniques.

Two dimensional projection module 310 can be used, for example, to define a three-dimensional surface model as a network of triangles in a three-dimensional model space, and to project vertices of those triangles from the three-dimensional model space onto a two-dimensional image space. Triangle definition module 320 can be used, for example, to parametrically define the two-dimensional projected triangles in terms of normalized edge equations for each triangle. Tile generation module 330 can be used, for example, to divide the two-dimensional image space into n tiles. Tile processing module 340 can be used, for example, to identify which projected triangles are potentially overlapped by which of the n tiles, and, for each of the n tiles, to process the identified overlapping triangles. As illustrated in FIG. 1, tile processing module 340 may include a sub-tile generation sub-module 345 and a sub-tile classification sub-module 345f Sub-tile generation sub-module 345 can be used, for example, to subdivide a selected one of the n tiles into of plurality of sub-tiles. Sub-tile classification module 345f can be used, for example, to classify the sub-tiles as being wholly within a selected triangle, wholly outside a selected triangle, or straddling an edge of a selected triangle. The results of this classification can be used to generate a list of pixels contained within the projected triangle. Additional details regarding the operation of these modules are provided in the "Methodology" subsection below.

The various embodiments disclosed herein can be implemented in various forms of hardware, software, firmware and/or special purpose processors. For example in one embodiment a non-transitory computer readable medium has instructions encoded thereon that, when executed by one or more processors, cause one or more of the triangle rasterization methodologies disclosed herein to be implemented. The instructions can be encoded using a suitable programming language, such a C, C++, object-oriented C, JavaScript or BASIC, or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, as described above, in certain embodiments client-side application user interface 160 provides multimedia rendering services by leveraging processing resources provided by server-side computer system 300. In other embodiments the functionalities disclosed herein can be incorporated into other software applications, such as video editing applications or other content generation, modification and/or management applications. The computer software applications disclosed herein may include a number of different modules, sub-modules or other components of distinct functionality, and can provide information to, or receive information from, still other components. These modules can be used, for example, to communicate with input and/or output devices such as a display screen, a touch sensitive surface, a printer and/or any other suitable raster device. Other componentry and functionality not reflected in the illustrations will be apparent in light of this disclosure, and it will be appreciated that the claimed invention is not intended to be limited to any particular hardware or software configuration. Thus in other embodiments computer systems 100, 300 may comprise additional, fewer or alternative subcomponents as compared to those included in the example embodiment of FIG. 1.

The aforementioned non-transitory computer readable medium may be any suitable medium for storing digital information, such as a hard drive, a server, a flash memory and/or random access memory. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software and firmware can be used, and that the present invention is not intended to be limited to any particular system architecture.

Methodology: Introduction

Figure 2D:
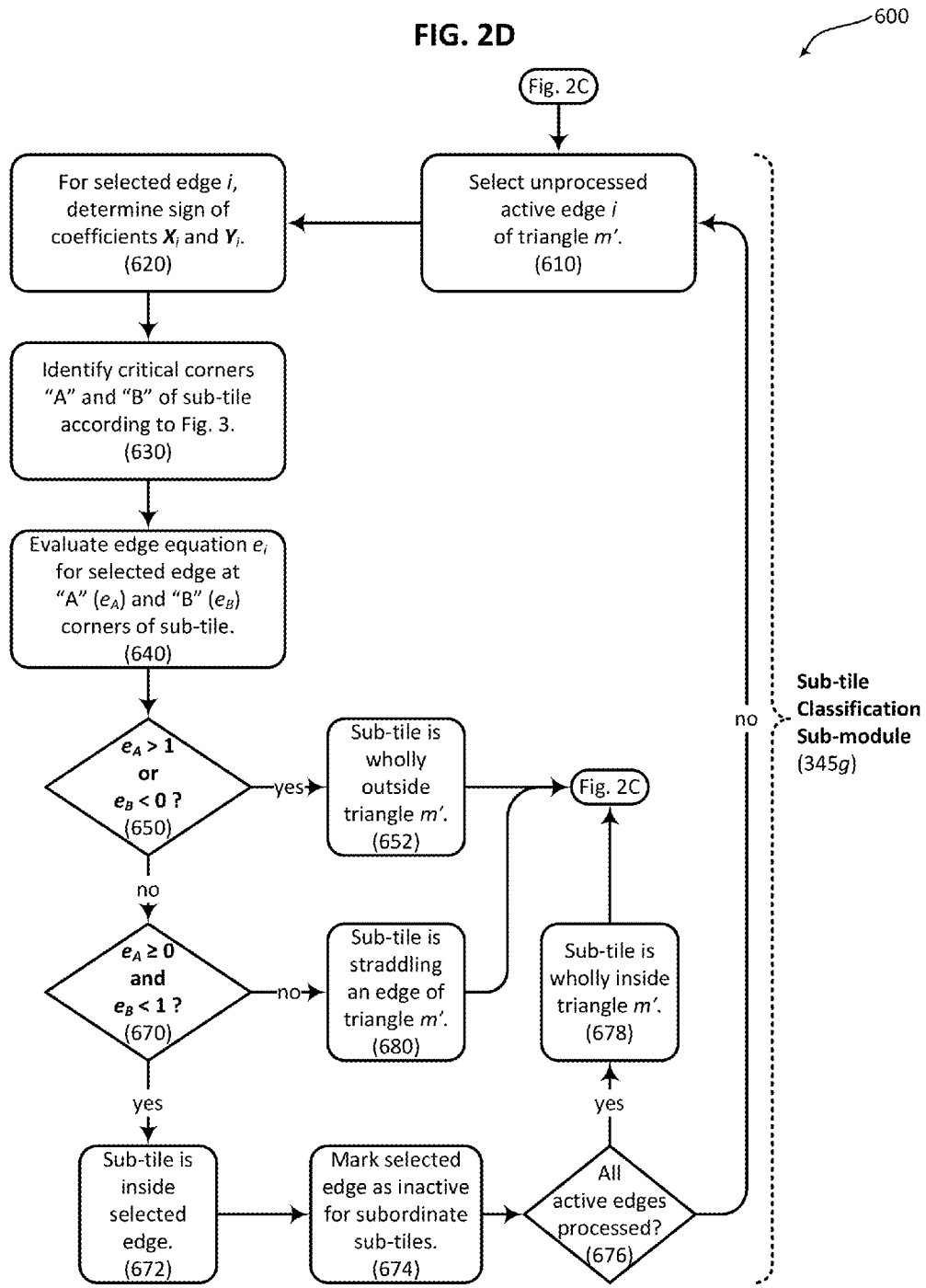
FIG. 2D is a flowchart illustrating an example sub-tile classification methodology that can be used in certain embodiments of the present invention for classifying a particular sub-tile with respect to a particular projected triangle m'.

FIG. 2A is a flowchart illustrating an example triangle rasterization methodology that can be used in certain embodiments of the present invention for deriving a list of pixels contained within a projected triangle. FIG. 2B is a flowchart illustrating an example tile processing methodology that can be used in certain embodiments of the present invention for processing tiles which are overlapped by a projected triangle for the purpose of deriving a list of pixels contained within the projected triangle. FIG. 2C is a flowchart illustrating an example sub-tile processing methodology that can be used in certain embodiments of the present invention for evaluating pixels of a particular tile n' with respect to a particular projected triangle m', based on a plurality of sub-tiles contained within the particular tile n'. FIG. 2D is a flowchart illustrating an example sub-tile classification methodology that can be used in certain embodiments of the present invention for classifying a particular sub-tile with respect to a particular projected triangle m'. As can be seen, these example methodologies include a number of phases and sub-processes, the sequence of which may vary from one embodiment to another. However, when considered in the aggregate, these phases and sub-processes form a complete triangle rasterization process that is responsive to user commands in accordance with certain of the embodiments disclosed herein. These methodologies can be implemented, for example using the system architecture illustrated in FIG. 1, as described above. However other system architectures can be used in other embodiments, as will be apparent in light of this disclosure. To this end, the correlation of the various functions shown in FIGS. 2A through 2D to the specific components illustrated in FIG. 1 is not intended to imply any structural and/or use limitations. Rather, other embodiments may include, for example, varying degrees of integration wherein multiple functionalities are effectively performed by one system. For example, in an alternative embodiment a single module can be used to project triangle vertices from three-dimensional model space onto two-dimensional image space, and to define the resulting projected triangles in terms of normalized edge equations. Thus, other embodiments may have fewer or more modules depending on the granularity of implementation. Numerous variations and alternative configurations will be apparent in light of this disclosure.

Methodology: Triangle Rasterization (FIG. 2A)

Figure 4A:
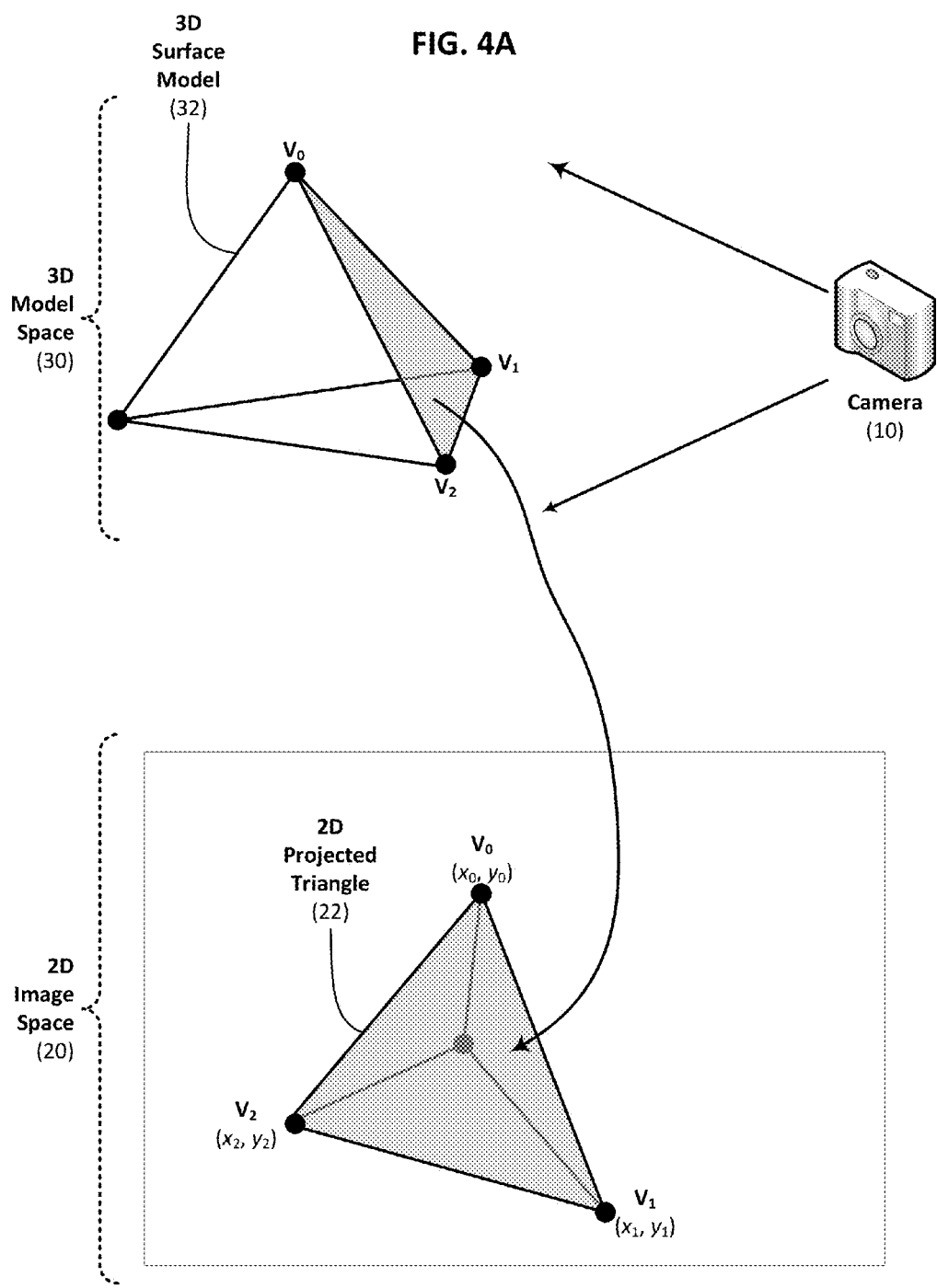
FIG. 4A illustrates the projection of a triangle from a three-dimensional model space onto a two-dimensional image space, as can be performed in certain embodiments of the present invention.

As illustrated in FIG. 2A, in one embodiment a triangle rasterization methodology 500 commences with defining a three-dimensional surface model as a mesh or network of triangles in three-dimensional model space (510*a*). For example, FIG. 4A illustrates a simple three-dimensional surface model 32 existing in a three-dimensional model space 30. While surface model 32 is illustrated as a simple tetrahedron for purposes of clarity, it will be appreciated that, in general, surface model 32 may be any arbitrary shape and may be defined by a surface comprising hundreds, thousands, millions or more triangles, each one of which may be defined by its three vertices $V_0$, $V_1$, $V_2$. Each of the triangle vertices may in turn be defined using a suitable coordinate system.

Referring again to FIG. 2A, once defined in three-dimensional model space, the vertices for each triangle defining surface model may then be projected from three-dimensional model space onto a two-dimensional image space (510*b*). In certain embodiments the two-dimensional image space corresponds to a W×H array of pixels provided by a raster device such as a display screen or printer. For example, FIG. 4A illustrates the projection of a selected triangle existing in three-dimensional model space 30 onto a two-dimensional image space 20, thereby resulting in a two-dimensional projected triangle 22. The projection indicates what three-dimensional surface model 32 would look like from a specified viewpoint, such as from the perspective of camera 10. For each triangle projected from three-dimensional model space 30 onto two-dimensional image space 20, the resulting two-dimensional projected triangle 22 may be defined by vertices having real floating point coordinates in two-dimensional image space $V_0(x_0, y_0)$, $V_1(x_1, y_1)$ and $V_2(x_2, y_2)$, as illustrated in FIG. 4A. Again, while only one triangle is illustrated as being projected in FIG. 4A, it will be appreciated that, in general, any number of triangles may be so projected and thus defined by coordinates in two-dimensional image space 20. In certain embodiments, defining the three-dimensional surface model and projecting the triangle vertices can be performed by two-dimensional projection module 310.

Once the vertices of projected triangle 22 are defined in two-dimensional image space 20, projected triangle 22 may be further defined in terms of three normalized edge equations (520), each of which defines the edge opposite a selected vertex. The normalized edge equations may be defined by $$e_i(x,y) = X_i x + Y_i y + C_i, \quad (1)$$

where the constants $X_i$, $Y_i$ and $C_i$ are given by $$X_i = \frac{y_k - y_j}{A}, \quad (2)$$

$$Y_i = \frac{x_k - x_j}{A}, \text{ and} \quad (3)$$

$$C_i = Y_i y_i - X_i x_i. \quad (4)$$

Here A represents the area of projected triangle 22. The parameter i corresponds to a selected one of the vertices of projected triangle 22, as illustrated in FIG. 4A, and therefore i=0, 1 or 2. The parameters j and k are given by $$j = (i+1)\%3, \text{ and} \quad (5)$$

$$k = (i+2)\%3. \quad (6)$$

Figure 4B:
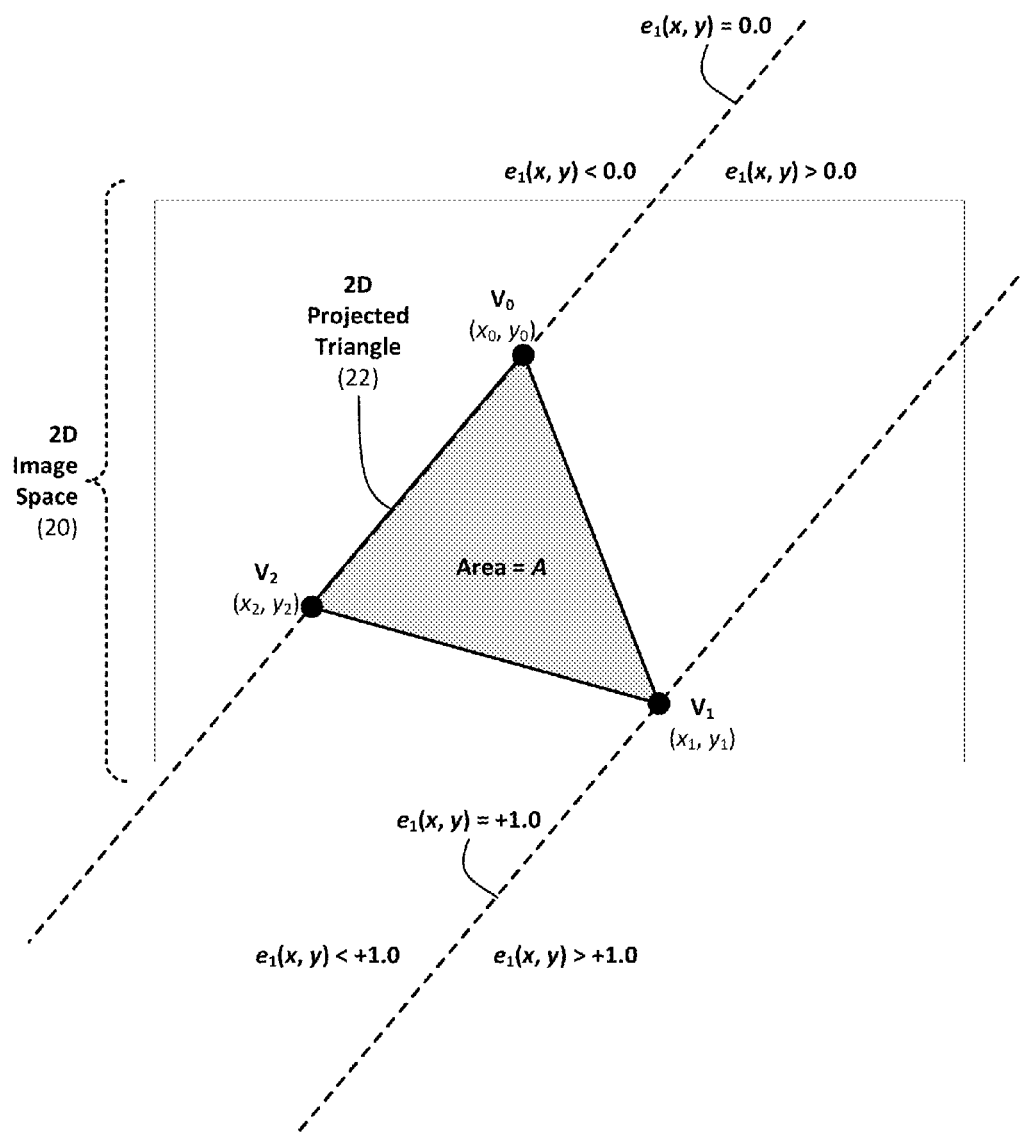
FIG. 4B illustrates the definition of normalized edge equation $e_1(x, y)$ for the edge opposite vertex $V_1$ of a two-dimensional projected triangle, as can be used in certain embodiments of the present invention.

Thus j refers to the vertex number that is clockwise adjacent to vertex $V_i$, and k refers to the vertex number that is counterclockwise adjacent to vertex $V_i$. The notation p % q refers to the remainder after numerical division of p by q. Thus, for instance, $X_i$ as defined in Equation (2) corresponds to the signed difference in y coordinates of the edge of the triangle that is opposite vertex $V_i$, divided by the triangle area. By way of example, FIG. 4B illustrates lines defined by $e_1 = 0.0$ and $e_1 = +1.0$ for projected triangle 22 illustrated in FIG. 4A. As can be seen, $e_1 = 0.0$ along a line coincident with the edge opposite vertex $V_1$, and $e_1 = +1.0$ along a parallel line passing through vertex $V_1$. Thus, for a given point within projected triangle 22, all three edge equations will evaluate to a number between zero and one, and for a given point outside projected triangle 22, at least one of the edge equations will evaluate to a number that is either less than zero or greater than one. In certain embodiments defining the two-dimensional projected triangles in terms of edge equations can be performed by triangle definition module 320.

Figure 4C:
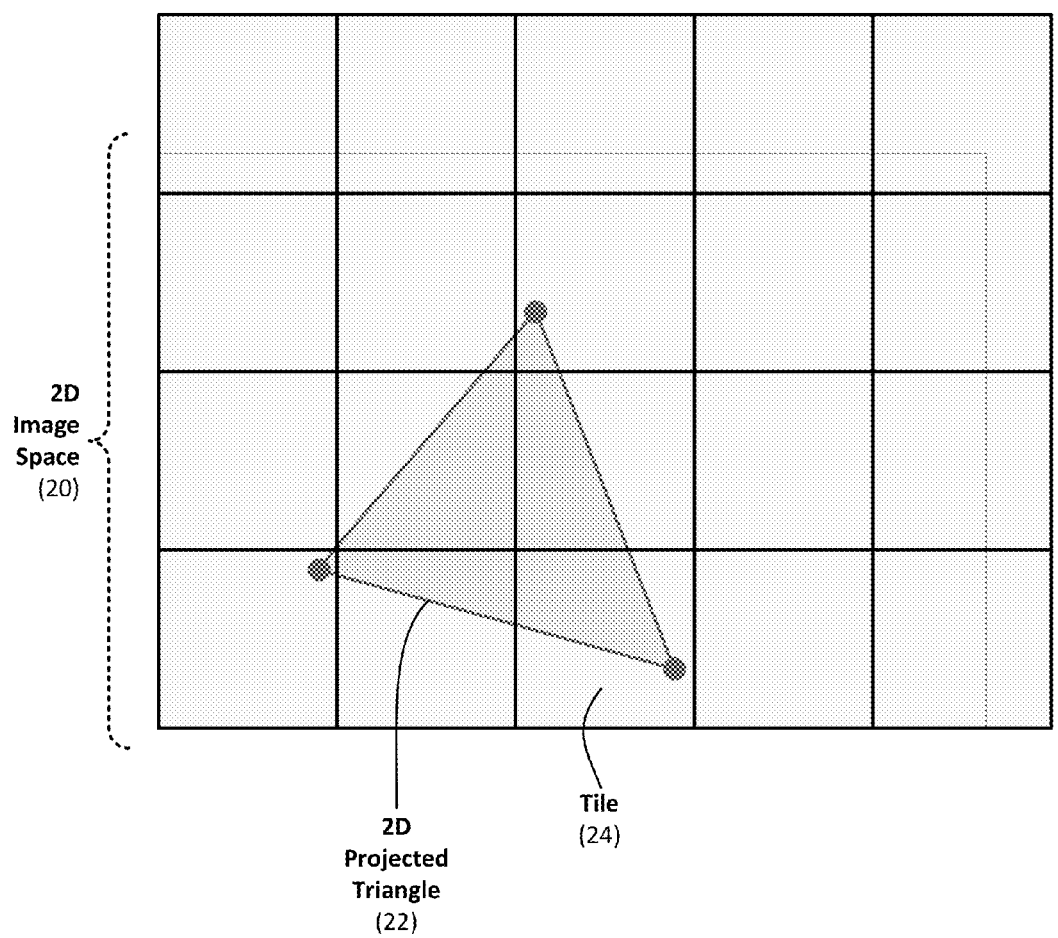
FIG. 4C illustrates the overlaying of a two-dimensional projected triangle onto an array of n tiles, as can be performed in certain embodiments of the present invention.

Once the projected triangles are defined in terms of their respective edge equations, the two-dimensional image space can be divided into a non-overlapping set of n tiles (530). As described above, in certain embodiments each of the n tiles is square and has a side length corresponding to a number of pixels that is an integral power of four. For example, in one embodiment each tile is a square pixel array having sides measuring $4^3 = 64$ pixels long and including $64^2 = 4096$ total pixels. In another embodiment each tile is a square pixel array having sides measuring $4^4 = 256$ pixels long and including $256^2 = 65,536$ total pixels. The methodologies disclosed herein can be used with a wide variety of different tile dimensions and therefore other dimensions may be used in other embodiments. FIG. 4C illustrates an array of n tiles 24, at least a portion of which are overlapped by projected triangle 22. While only one projected triangle is illustrated in FIG. 4C for purposes of clarity, it will be appreciated that, in general, image space 20 will include a large number of projected triangles, and thus that a given one of the n tiles may be overlapped by a plurality of different projected triangles. In certain embodiments dividing the two-dimensional image space into an array of n non-overlapping tiles can be performed by tile generation module 330.

After the two-dimensional image space is divided into an array of n tiles, it is possible to identify which projected triangles are potentially overlapping which tiles (540*a*). In one embodiment this can be accomplished by comparing the minimum and maximum coordinates of the projected triangle vertices with the minimum and maximum coordinates of each of the n tiles. In another embodiment this can be accomplished through the generation of axis-aligned gross bounding boxes that contain each of the projected triangles; the coordinates of such bounding boxes can be compared with the coordinates of each of the n tiles to determine which triangles potentially overlap a given tile. Other techniques for identifying which triangles potentially overlap a given tile can be used in other embodiments. Thus, in certain embodiments this identification technique will result in a list of m potentially overlapping triangles for each one of the n tiles, where m≥0. In such embodiments this identification of potentially overlapping triangles can be performed by tile processing module 340.

The n tiles can then be processed with respect to the identified potentially overlapping projected triangles (540*b*), thereby allowing a list of pixels contained within each projected triangle to be derived. An example embodiment of a tile processing methodology 540 which can be used in this regard is illustrated in FIG. 2B. For the purposes of performing tile processing methodology 540, the n tiles can be allocated to a plurality of separate processing threads, each of which may be simultaneously executed on a distinct processor core, such as the plurality of processor cores comprising array 350 illustrated in FIG. 1. This allows the computational efficiencies associated with an MIMD processing architecture to be realized in the processing of the n tiles. In one embodiment the number of tiles n corresponds to the number of separate processor cores available in array 350, in which case all of the tiles can be processed simultaneously. In embodiments wherein the number of tiles n exceeds the number of separate processor cores available in array 350, a portion of the tiles can be processed simultaneously. For example, in an embodiment where n/2 processor cores are available, two tiles can be allocated to each processor core. Such processing can be performed by tile processing module 340. After this processing of the n tiles is complete, triangle rasterization methodology 500 can be concluded.

Methodology: Tile Processing (FIG. 2B)

FIG. 2B illustrates an example embodiment of tile processing methodology 540 which can be used in certain embodiments for processing tiles which are overlapped by a projected triangle for the purpose of deriving a list of pixels contained within the projected triangle. As set forth above, this methodology can be applied to the plurality of tiles by simultaneously performing the method using a corresponding plurality of distinct processing threads. Depending on the number of processor cores available, each processor can be allocated anywhere from one to n tiles for processing. For example, in the case where the number of tiles corresponds to the number available processor cores, each processor core can be allocated one tile for processing. Alternatively, in the case where only one processor core is available for processing, all n tiles can be allocated to that single processor core for processing. Thus FIG. 2B illustrates tile processing methodology 540 with respect to a single processing core which may be allocated up to n tiles for processing. It will be appreciated that, in certain other embodiments, this methodology can be executed simultaneously on a plurality of processor cores with respect to a plurality of tiles.

As illustrated in FIG. 2B, in one embodiment tile processing methodology 540 commences by setting a counter n'=1 (541). The variable m is set to equal the number of triangles overlapping tile n' (542). It is then determined whether m=0 (543*a*). If m=0 (that is, if no triangles overlap tile n'), the counter n' is incremented (543*b*). It is then determined whether the counter n' exceeds the total number of tiles n to be processed (543*c*). If n'>n (that is, if no further tiles remain to be processed), tile processing methodology 540 terminates; otherwise, if n'≤n, tile processing methodology 540 continues with the next tile n'. If m>0 (that is, if at least one triangle overlaps tile n'), set counter m'=1 (544). The pixels of tile n' can then be processed with respect to triangle m' (545). In certain embodiments this processing is conducted by sub-tile generation sub-module 345 using a sub-tile processing methodology 545 such as that illustrated in FIG. 2C and described in greater detail below. This processing generates a list of pixels contained within projected triangle m'. The pixels contained within projected triangle m' are optionally composited into a current pixel buffer based on pixel depths (546). After projected triangle m' has been processed, the counter m' is incremented (547). It is then determined whether counter m' exceeds the total number of projected triangles m overlapping tile n' (548). If m'>m (that is, if no further projected triangles remain to be processed with respect to tile n'), the counter n' is incremented (543*b*) and processing proceeds as described above. Otherwise, if m'≤m, the tile processing methodology continues with the next potentially overlapping triangle m'.

Methodology: Sub-Tile Generation (FIG. 2C)

FIG. 2C illustrates an example embodiment of sub-tile processing methodology 545 which can be used in certain embodiments for evaluating pixels of a particular tile n' with respect to a particular projected triangle m', based on a plurality of sub-tiles contained within the particular tile n'. This methodology can be performed as part of tile processing methodology 540 illustrated in FIG. 2B. In one embodiment sub-tile processing methodology 545 commences with adding tile n' to a queue of tiles and sub-tiles that are to be processed (545*a*). It is then determined whether the queue is empty (545*b*), as may be the case in subsequent recursions of methodology 545 where all other tiles and sub-tiles have already been processed. If the queue is empty, the processing returns to tile processing methodology 540 described above in conjunction with FIG. 2B for subsequent processing of the next tile (if any) and/or potentially overlapping projected triangle (if any). If the queue is not empty, a selected tile or sub-tile is removed from the queue (545*c*). The selected tile or sub-tile is then divided into a 4×4 grid of 16 equally-sized sub-tiles or subordinate (smaller) sub-tiles (545*d*). For example, in an embodiment where each tile has an edge that is 64 pixels long, each sub-tile in a 4×4 grid would have an edge that is 64÷4=16 pixels long and would comprise $16^2$=256 total pixels. As another example, in an embodiment where each tile has an edge that is 256 pixels long, each sub-tile in a 4×4 grid would have an edge that is 256÷4=64 pixels long and would comprise $64^2$=4096 total pixels. However, notwithstanding these examples, it will be appreciated that in other embodiments a selected tile n' may be subdivided into other quantities of sub-tiles for purposes of the sub-tile processing methodology disclosed herein, and thus the present invention should not be understood as being limited to any particular way of subdividing selected tile n'.

Still referring to FIG. 2C, once a grid of sub-tiles is generated, parallel processing of the sub-tiles can be initiated (545e). This parallel processing can be used to classify each of the sub-tiles with respect to triangle m' (545f), wherein this classification results in a determination that a given sub-tile is wholly outside triangle m', wholly inside triangle m', or straddling an edge of triangle m'. An example embodiment of a sub-tile classification methodology 600 which can be used in this regard is illustrated in FIG. 2D and described in greater detail below. For the purposes of sub-tile classification methodology 600, the sub-tiles can be classified simultaneously by loading their data in sequence into the wide registers of a modern processor and then applying a uniform set of instructions to the entire processor. This allows the computational efficiencies associated with an SIMD processing architecture to be realized in the classification of the plurality of sub-tiles. Thus, in one embodiment the number of sub-tiles corresponds to the capacity of the corresponding processor core to perform such simultaneous processing. In certain embodiments this classification is performed by sub-tile classification sub-module 345f using sub-tile classification methodology 600 illustrated in FIG. 2D.

Figure 4D:
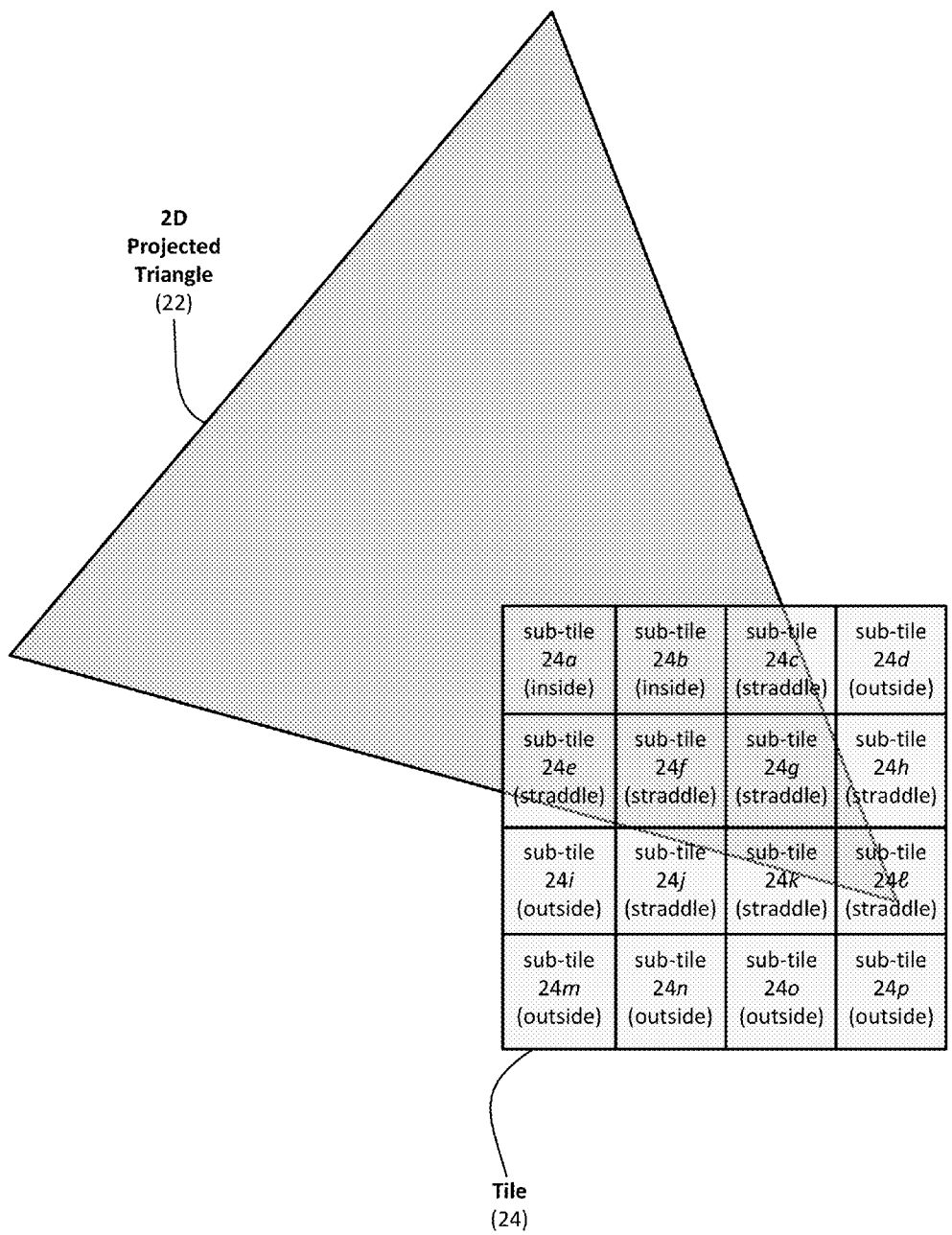
FIG. 4D illustrates the classification of sub-tiles forming a 4×4 array as being either wholly inside, wholly outside, or straddling a two-dimensional projected triangle, as can be performed in certain embodiments of the present invention.

As illustrated in FIG. 2C, sub-tile classification methodology 600 results in a determination that a given sub-tile is wholly outside triangle m', wholly inside triangle m', or straddling an edge of triangle m'. For example, FIG. 4D illustrates tile 24 which comprises a 4×4 grid of 16 sub-tiles 24a through 24p. Each of the sub-tiles has been classified as being wholly outside projected triangle 22 (see, for example sub-tiles 24i and 24m), wholly inside projected triangle 22 (see, for example, sub-tiles 24a and 24b), or straddling an edge of projected triangle 22 (see, for example, sub-tiles 24c and 24e). If it is determined that the sub-tile is wholly outside triangle m', processing of the sub-tile is terminated (545g) and it is once again determined whether the queue of tiles and sub-tiles is empty (545b). If it is determined that the sub-tile is wholly within triangle m', then the pixels within that sub-tile are added to a list of pixels within triangle m' (545h). Processing of the sub-tile is terminated (545g), and it is once again determined whether the queue of tiles and sub-tiles is empty (545b).

If it is determined that the sub-tile is straddling an edge of triangle m', then it is determined whether further subdivision of the sub-tile is possible (545i). For example, if the dimension of the sub-tile falls below a predetermined limit beyond which further subdivision is impossible, the straddling sub-tile can be processed according to a default instruction. In the example embodiment of sub-tile processing methodology 545 illustrated in FIG. 2C, the default instruction comprises adding the pixels within the sub-tile to the list of pixels within triangle m' (545h). In an alternative embodiment, the default instruction may comprise terminating sub-tile processing (545g) without adding any pixels to such list. It will be appreciated that the aforementioned predetermined limit may be expressed in terms of pixel size, and may equal a number greater than one pixel, equal to one pixel, or less than one pixel. Where the predetermined limit is less than one pixel, the triangle rasterization methodology disclosed herein may result in the generation of sub-pixel fragments included within the list of pixels contained within a projected triangle. Where further subdivision of a straddling sub-tile is possible, the sub-tile is returned to the queue of tiles and sub-tiles to be processed (545j), and the methodology 545 can then be recursively processed as described above with respect to the originally-sized (larger) sub-tiles. For example, where a 16-pixel-square sub-tile is found to straddle an edge of a given projected triangle, that sub-tile may be subsequently subdivided into a 4×4 grid of sub-tiles, each having an edge that is 16÷4=4 pixels long and comprising $4^2=16$ total pixels. However, notwithstanding this example, it will be appreciated that in other embodiments a selected sub-tile may be subdivided into other quantities of sub-tiles for purposes of the processing methodology disclosed herein, and thus the present invention should not be understood as being limited to any particular way of further subdividing a given sub-tile.

Methodology: Sub-Tile Classification (FIG. 2D)

Figure 3:
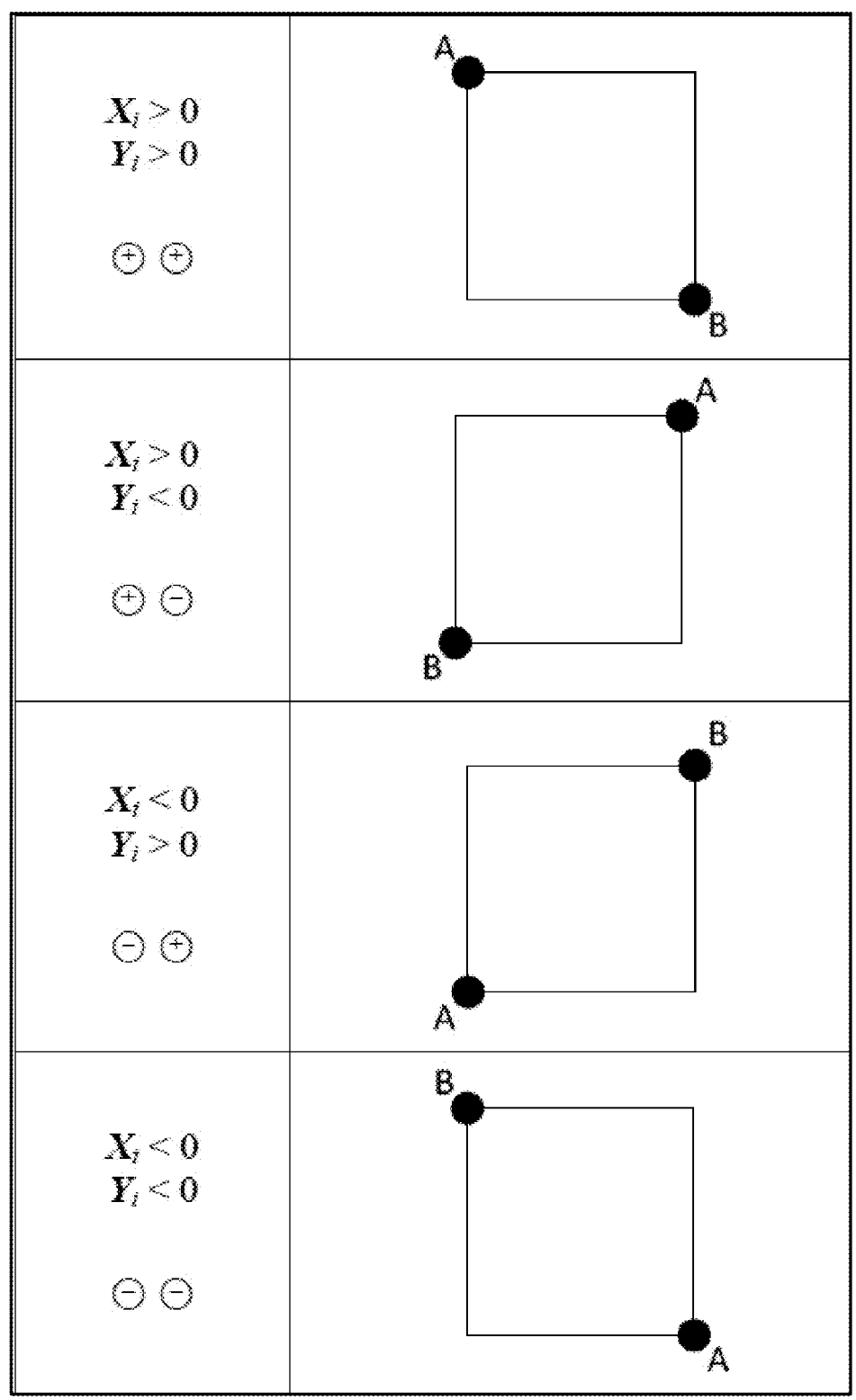
FIG. 3 illustrates how critical corners of a sub-tile can be selected in certain embodiments of the present invention, based on the signs of parameters $X_i$ and $Y_i$ which at least partially define normalized edge equation $e_i(x, y)$ for a projected triangle.

FIG. 2D illustrates an example embodiment of sub-tile classification methodology 600 which can be used in certain embodiments to classify a particular sub-tile with respect to a particular projected triangle m'. This methodology can be performed as part of sub-tile processing methodology 545 illustrated in FIG. 2C. In one embodiment sub-tile classification methodology 600 commences with selecting an unprocessed active edge i of projected triangle m' (610). The signs of coefficients $X_i$ and $Y_i$ for edge equation $e_i$ corresponding to selected active edge i can then be determined (620). The signs of these coefficients, which can be determined using Equations (2) and (3), can be used to identify two critical corners—referred to herein as corners "A" and "B"—of the sub-tile with respect to the edge i of the projected triangle (630). Corners "A" and "B" can be considered critical corners because when edge equation $e_i$ is evaluated at these corners, the resulting two values correspond to the maximum and minimum barycentric coordinates of the sub-tile with respect to selected edge i. The correspondence of the signs of coefficients $X_i$ and $Y_i$ and the identification of the "A" and "B" corners is illustrated in FIG. 3; as illustrated, the critical corners are located on opposite sides of a diagonal of the sub-tile. Thus once the critical corners are identified, edge equation $e_i$ can be evaluated at the "A" and "B" critical corners of the sub-tile (640); the resulting values are referred to herein as $e_A$ and $e_B$.

Once the edge equation corresponding to the selected edge of projected triangle m' is evaluated at critical corners "A" and "B", the following processing may be performed, as illustrated in FIG. 2D:

(a) First, it is determined whether either $e_A>1$ or $e_B<0$ (650).
  (i) If either $e_A>1$ or $e_B<0$, then it is determined that the sub-tile is wholly outside triangle m' (652), and the processing returns to sub-tile processing methodology 545 illustrated in FIG. 2C.
  (ii) If either $e_A \leq 1$ or $e_B \geq 0$, then the processing continues to (b), below.
(b) Second, it is determined whether both $e_A \geq 0$ and $e_B<1$ (670).
  (i) If both $e_A \geq 0$ and $e_B<1$, then it is determined that the sub-tile is inside the selected edge of triangle m' (672), and the selected edge is optionally marked as inactive for subordinate sub-tiles (674). A subordinate sub-tile is a smaller sub-tile resulting from further subdivision of a given sub-tile. Marking the selected edge as inactive for subordinate sub-tiles advantageously allows future evaluations of the selected edge to be bypassed for subordinate sub-tiles resulting from possible future subdivision of the sub-tile, thereby further streamlining the triangle rasterization process. Thus edges which are marked as inactive need not be evaluated again during future recursion. Once it is determined that the sub-tile is inside the selected edge, it is then determined whether all active edges of the projected triangle m' have been processed (676).

(1) If all active edges of the projected triangle m' have not been processed, then sub-tile classification methodology 600 is repeated for an unprocessed active edge of triangle m'.

(2) If all active edges of the projected triangle m' have been processed, it is determined that the sub-tile is wholly inside triangle m' (678), and the processing returns to sub-tile processing methodology 545 illustrated in FIG. 2C.

(ii) If either $e_A<0$ or $e_B \geq 1$, then it is determined that the sub-tile is straddling the selected edge of projected triangle m' (680), and the processing returns to sub-tile processing methodology 545 illustrated in FIG. 2C.

Figure 4E:
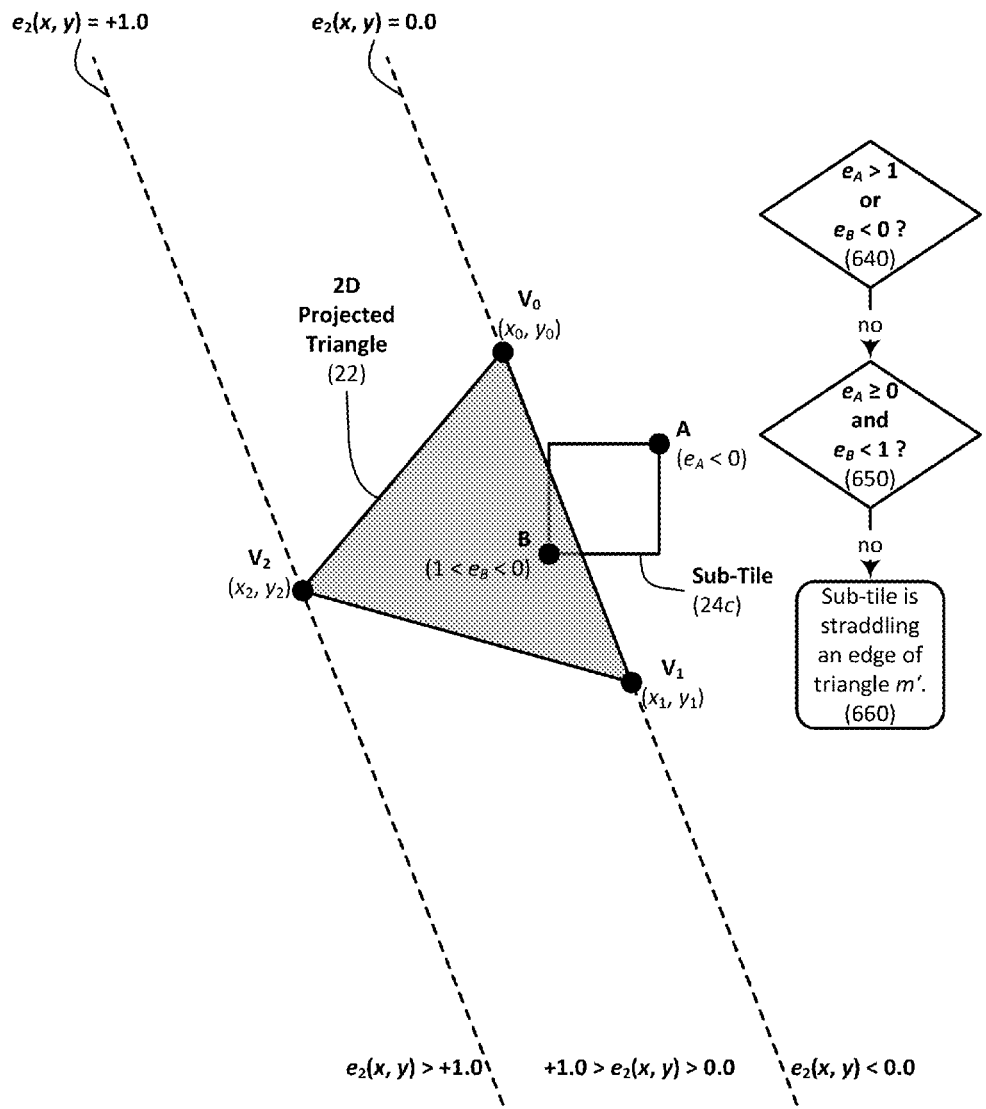
FIG. 4E illustrates the evaluation of a selected sub-tile with respect to a selected edge of a two-dimensional projected triangle, as can be performed in certain embodiments of the present invention.

FIG. 4E illustrates an example of how sub-tile classification methodology 600 can be applied to classify sub-tile 24c with respect to edge 2 of projected triangle 22. In this example, the coefficients $X_2>0$ and $Y_2<0$, leading to the allocation of "A" and "B" corners as shown in FIGS. 3 and 4E. Based on the position of sub-tile 24c, the edge equation corresponding to edge 2 of the projected triangle will evaluate less than zero at corner "A" (that is, $e_A \leq 0$). Likewise, the edge equation corresponding to edge 2 of the triangle will evaluate to a value between zero and one at corner "B" (that is, $1<e_B<0$). Therefore, when sub-tile classification methodology 600 is applied, as illustrated in relevant part in FIG. 4E, it is determined that sub-tile 24c is straddling projected triangle 22. In this case, other edges of projected triangle 22 need not be processed with respect to sub-tile 24c since it is impossible for sub-tile 24c to fall wholly within or wholly outside projected triangle 22.

The example sub-tile classification methodology 600 illustrated in FIG. 2D in which a sub-tile is classified with respect to an active edge lends itself well to SIMD processing. For instance, depending on the format used to represent the edges of projected triangle m' and the size of the available SIMD registers, it is possible to simultaneously classify all 16 sub-tiles in a 4×4 grid. Thus, in certain embodiments the number of sub-tiles generated when a tile is subdivided depends on the size of the SIMD registers which are used to classify the resulting sub-tiles. Associating the number of sub-tiles with the width of the SIMD registers advantageously allows the computational efficiencies associated with an SIMD processing architecture to be realized in the classification of the plurality of sub-tiles.

CONCLUSION

Numerous variations and configurations will be apparent in light of this disclosure. For instance, one example embodiment provides a computer-implemented rasterization method comprising defining a plurality of projected triangles in a two-dimensional image space. The two-dimensional image space corresponds to a pixel array. The method further comprises dividing the two-dimensional image space into a plurality of tiles. The projected triangles overlap at least a portion of the tiles. The method further comprises processing a first selected tile so as to generate a first list of pixels contained within a first projected triangle overlapping the first selected tile. Such processing comprises subdividing the first selected tile into a first plurality of sub-tiles which are classified with respect to at least one edge of the first projected triangle. The method further comprises processing a second selected tile so as to generate a second list of pixels contained within a second projected triangle overlapping the second selected tile. Such processing comprises subdividing the second selected tile into a second plurality of sub-tiles which are classified with respect to at least one edge of the second projected triangle. The processing of the first and second selected tiles is performed at least partially simultaneously using respective first and second processor cores of a processor array comprising a plurality of processor cores. In some cases (a) classifying the first plurality of sub-tiles with respect to at least one edge of the first projected triangle comprises (i) sequentially loading data associated with the first plurality of sub-tiles into a common processor register of the first processor core, and (ii) applying a uniform set of instructions to the common processor register of the first processor core; and (b) classifying the second plurality of sub-tiles with respect to at least one edge of the second projected triangle comprises (i) sequentially loading data associated with the second plurality of sub-tiles into a common processor register of the second processor core, and (ii) applying the uniform set of instructions to the common processor register of the second processor core. In some cases the method further comprises projecting a plurality of triangles from a three-dimensional model space into the two-dimensional image space. In some cases each of the plurality of projected triangles are defined in the two-dimensional image space based on three edge equations corresponding to respective edges of each projected triangle. In some cases the first and second selected tiles have a square shape with a side length equal to a number of pixels that is an even power of two. In some cases the first and second pluralities of sub-tiles each comprise sixteen square-shaped sub-tiles.

Another example embodiment of the present invention provides a computer program product encoded with instructions that, when executed by one or more processors, causes a process to be carried out. The process comprises defining a plurality of projected triangles in a two-dimensional image space, the two image space corresponding to a pixel array. The process further comprises dividing the two-dimensional image space into a plurality of tiles, wherein the projected triangles overlap at least a portion of the tiles. The process further comprises processing a first selected tile so as to generate a first list of pixels contained within a first corresponding projected triangle that overlaps the first selected tile. Such processing comprises subdividing the first selected tile into a plurality of sub-tiles. Such processing further comprises classifying the plurality of sub-tiles as being wholly within the first corresponding projected triangle, wholly outside the first corresponding projected triangle, or straddling an edge of the first corresponding projected triangle. Classifying the plurality of sub-tiles is performed by (a) sequentially loading data associated with the plurality of sub-tiles into a common processor register, and (b) applying a uniform set of instructions to the common processor register. In some cases the process further comprises processing a second selected tile so as to generate a second list of pixels contained within a second corresponding projected triangle that overlaps the second selected tile, wherein the first and second selected tiles are processed simultaneously using respective first and second processor cores of a processor array comprising a plurality of processor cores, and wherein the common processor register forms part of the first processor core. In some cases the process further comprises processing the first selected tile so as to generate a second list of pixels contained within a second corresponding projected triangle that overlaps the second selected tile. In some cases subdividing the first selected tile into a plurality of sub-tiles comprises generating a 4×4 grid of square-shaped sub-tiles.

Another example embodiment of the present invention provides a triangle rasterization method the comprises defining a projected triangle in a two-dimensional image space that corresponds to a pixel array. The projected triangle is defined by three edge equations corresponding to respective edges of the projected triangle. The method further comprises dividing the two-dimensional image space into a plurality of tiles. The projected triangle overlaps at least a portion of the tiles. The method further comprises subdividing a selected tile into an array of sub-tiles. The method further comprises evaluating a selected edge equation at two critical corners of a selected sub-tile. The two critical corners of the selected sub-tile correspond to maximum and minimum barycentric coordinates of the selected sub-tile with respect to an edge corresponding to the selected edge equation. The method further comprises based on evaluating the selected edge equation at the two critical corners, classifying the sub-tile as wholly outside the projected triangle, inside the edge corresponding to the selected edge equation, or straddling the edge corresponding to the selected edge equation. In some cases the method further comprises projecting a network of triangles in three-dimensional model space into the two-dimensional image space. In some cases the method further comprises subdividing the selected sub-tile into an array of subordinate sub-tiles when the selected sub-tile is classified as straddling the edge corresponding to the selected edge equation. In some cases the method further comprises (a) evaluating a second selected edge equation at two critical corners of the selected sub-tile, wherein the two critical corners correspond to maximum and minimum barycentric coordinates of the selected sub-tile with respect to an edge corresponding to the second selected edge equation; (b) evaluating a third selected edge equation at two critical corners of the selected sub-tile, wherein the two critical corners correspond to maximum and minimum barycentric coordinates of the selected sub-tile with respect to an edge corresponding to the third selected edge equation; and (c) adding pixels corresponding to the selected sub-tile to a list of pixels within the projected triangle where the selected sub-tile is classified as inside the three edges corresponding to the three edge equations. In some cases the method further comprises marking the selected edge as inactive for subordinate sub-tiles of the selected sub-tile where the selected sub-tile is classified as inside the edge corresponding to the selected edge equation. In some cases the two critical corners are located on opposite sides of a diagonal of the selected sub-tile.

Another example embodiment of the present invention provides a system comprising a triangle definition module configured to define a projected triangle in a two-dimensional image space that corresponds to a pixel array. The projected triangle is defined in terms of three edge equations corresponding to respective edges of the projected triangle. The system further comprises a tile generation module configured to divide the two-dimensional image space into a plurality of tiles. The projected triangle overlaps at least one of the tiles. The system further comprises a tile processing module configured to generate a list of pixels contained within the projected triangle. The tile processing module comprises a sub-tile generation sub-module configured to subdivide a selected tile into a plurality of sub-tiles. The tile processing module further comprises a sub-tile classification sub-module configured to classify a selected sub-tile with respect to the projected triangle. The system further comprises a processor array comprising a plurality of processor cores. The sub-tile generation sub-module is configured to process at least a portion of the tiles simultaneously using multiple processor cores. The sub-tile classification sub-module is configured to classify at least a portion of the sub-tiles simultaneously by (a) sequentially loading data associated with the portion of the sub-tiles into a common processor register of a selected processor core, and (b) applying a uniform set of instructions to the common processor register. In some cases the plurality of tiles includes a number of tiles that is less than or equal to a number of processor cores included within the processor array. In some cases the sub-tile classification sub-module is configured to classify all of the sub-tiles simultaneously. In some cases the system further comprises a two-dimensional projection module configured to project a network of triangles in three-dimensional model space into the two-dimensional image space.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A triangle rasterization method comprising:
defining a projected triangle in a two-dimensional image space that corresponds to a pixel array, wherein the projected triangle is defined by three normalized edge equations corresponding to respective edges of the projected triangle, wherein each of the normalized edge equations evaluates to a first normalized value along a corresponding edge and evaluates to a second normalized value at a point that is opposite the corresponding edge, and that is defined by an intersection of two other edges of the projected triangle;
dividing the two-dimensional image space into a plurality of tiles, wherein the projected triangle overlaps at least a portion of the tiles;
subdividing a selected tile into an array of sub-tiles;
evaluating a selected normalized edge equation at two critical corners of a selected sub-tile, wherein the two critical corners of the selected sub-tile correspond to maximum and minimum barycentric coordinates of the selected sub-tile with respect to an edge corresponding to the selected normalized edge equation;
comparing the evaluated selected normalized edge equation to the first and second normalized values; and
classifying the selected sub-tile as wholly outside the projected triangle, inside the edge corresponding to the selected normalized edge equation, or straddling the edge corresponding to the selected normalized edge equation,
wherein evaluating, comparing, and classifying are performed using a first processor core of a processor array comprising a plurality of processor cores.

2. The triangle rasterization method of claim 1, further comprising projecting a network of triangles in three-dimensional model space into the two-dimensional image space.

3. The triangle rasterization method of claim 1, further comprising subdividing the selected sub-tile into an array of subordinate sub-tiles when the selected sub-tile is classified as straddling the edge corresponding to the selected normalized edge equation.

4. The triangle rasterization method of claim 1, further comprising:
evaluating a second selected normalized edge equation at two critical corners of the selected sub-tile, wherein the two critical corners correspond to maximum and minimum barycentric coordinates of the selected sub-tile with respect to an edge corresponding to the second selected normalized edge equation;
evaluating a third selected normalized edge equation at two critical corners of the selected sub-tile, wherein the two critical corners correspond to maximum and minimum barycentric coordinates of the selected sub-tile with respect to an edge corresponding to the third selected normalized edge equation; and
adding pixels corresponding to the selected sub-tile to a list of pixels within the projected triangle where the selected sub-tile is classified as inside the three edges corresponding to the three normalized edge equations.

5. The triangle rasterization method of claim 1, further comprising marking the edge corresponding to the selected normalized edge equation as inactive for subordinate sub-tiles of the selected sub-tile where the selected sub-tile is classified as inside the edge corresponding to the selected normalized edge equation.

6. The triangle rasterization method of claim 1, wherein the two critical corners are located on opposite sides of a diagonal of the selected sub-tile.

7. The method of claim 1, wherein the array of sub-tiles comprises sixteen square-shaped sub-tiles.

8. A triangle rasterization system comprising a memory device and a processor array that is operatively coupled to the memory device, wherein the processor array includes a plurality of processor cores, and wherein the processor array is configured to execute instructions stored in the memory device that, when executed, cause the processor array to carry out a triangle rasterization process that comprises:
defining a projected triangle in a two-dimensional image space that corresponds to a pixel array, wherein the projected triangle is defined in terms of three normalized edge equations corresponding to respective edges of the projected triangle, wherein each of the normalized edge equations evaluates to a first normalized value along a corresponding edge and evaluates to a second normalized value at a point that is opposite the corresponding edge, and that is defined by an intersection of two other edges of the projected triangle;
dividing the two-dimensional image space into a plurality of tiles, wherein the projected triangle overlaps at least one of the tiles;
subdividing a selected tile into a plurality of sub-tiles;
evaluating a selected normalized edge equation at two critical corners of a selected sub-tile, wherein the two critical corners of the selected sub-tile correspond to maximum and minimum barycentric coordinates of the selected sub-tile with respect to an edge corresponding to the selected normalized edge equation;
comparing the evaluated selected normalized edge equation to the first and second normalized values; and
classifying the selected sub-tile with respect to the projected triangle,
wherein the plurality of processor cores are configured to process at least a portion of the tiles simultaneously, and
wherein the plurality of processor cores are further configured to classify at least a portion of the sub-tiles simultaneously by (a) sequentially loading data associated with the portion of the sub-tiles into a common processor register of a selected processor core, and (b) applying a uniform set of instructions to the common processor register.

9. The system of claim 8, wherein the plurality of tiles includes a number of tiles that is less than or equal to a number of processor cores included within the processor array.

10. The system of claim 8, wherein all of the sub-tiles are processed simultaneously.

11. The system of claim 8, wherein the triangle rasterization process further comprises projecting a network of triangles in three-dimensional model space into the two-dimensional image space.

12. The system of claim 8, wherein each of the plurality of tiles has a square shape with a side length equal to a number of pixels that is an even power of two.

13. The system of claim 8, wherein the selected sub-tile is classified as wholly outside the projected triangle, inside the edge corresponding to the selected normalized edge equation, or straddling the edge corresponding to the selected normalized edge equation.

14. A non-transitory computer readable medium having instructions encoded thereon that, when executed using a processor array that includes a plurality of processor cores, cause a triangle rasterization process to be carried out, the process comprising:
defining a projected triangle in a two-dimensional image space that corresponds to a pixel array, wherein the projected triangle is defined by three normalized edge equations corresponding to respective edges of the projected triangle, wherein each of the normalized edge equations evaluates to a first normalized value along a corresponding edge and evaluates to a second normalized value at a point that is opposite the corresponding edge, and that is defined by an intersection of two other edges of the projected triangle;
dividing the two-dimensional image space into a plurality of tiles, wherein the projected triangle overlaps at least a portion of the tiles;
subdividing a selected tile into an array of sub-tiles;
evaluating a selected normalized edge equation at two critical corners of a selected sub-tile, wherein the two critical corners of the selected sub-tile correspond to maximum and minimum barycentric coordinates of the selected sub-tile with respect to an edge corresponding to the selected normalized edge equation;
comparing the evaluated selected normalized edge equation to the first and second normalized values; and
classifying the selected sub-tile as wholly outside the projected triangle, inside the edge corresponding to the selected normalized edge equation, or straddling the edge corresponding to the selected normalized edge equation,
wherein evaluating, comparing, and classifying are performed using a first processor core of the processor array.

15. The non-transitory computer readable medium of claim 14, wherein the plurality of processor cores are configured to classify at least a portion of the sub-tiles simultaneously by (a) sequentially loading data associated with the portion of the sub-tiles into a common processor register of a selected processor core, and (b) applying a uniform set of instructions to the common processor register.

16. The non-transitory computer readable medium of claim 14, wherein the triangle rasterization process further comprises projecting a plurality of triangles from a three-dimensional model space into the two-dimensional image space.

17. The non-transitory computer readable medium of claim 14, wherein the array of sub-tiles comprises sixteen square-shaped sub-tiles.

18. The non-transitory computer readable medium of claim 14, wherein the selected tile has a square shape with a side length equal to a number of pixels that is an even power of two.

19. The non-transitory computer readable medium of claim 14, wherein the triangle rasterization process further comprises subdividing the selected sub-tile into an array of subordinate sub-tiles when the selected sub-tile is classified as straddling the edge corresponding to the selected normalized edge equation.

20. The non-transitory computer readable medium of claim 14, wherein the triangle rasterization process further comprises marking the edge corresponding to the selected normalized edge equation as inactive for subordinate sub-tiles of the selected sub-tile where the selected sub-tile is classified as inside the edge corresponding to the selected normalized edge equation.

* * * * *